A. J. DIESCHER.
APPARATUS FOR REGISTERING THE FLOW OF FLUIDS.
APPLICATION FILED NOV. 22, 1909.

986,048.

Patented Mar. 7, 1911.

3 SHEETS—SHEET 2.

WITNESSES:
J. Herbert Bradley
Theodore F. Duff

INVENTOR
Alfred J. Diescher
by Christy and Christy
Att'ys

A. J. DIESCHER.
APPARATUS FOR REGISTERING THE FLOW OF FLUIDS.
APPLICATION FILED NOV. 22, 1909.

986,048.

Patented Mar. 7, 1911.

3 SHEETS—SHEET 3.

WITNESSES:

INVENTOR

UNITED STATES PATENT OFFICE.

ALFRED J. DIESCHER, OF PITTSBURG, PENNSYLVANIA.

APPARATUS FOR REGISTERING THE FLOW OF FLUIDS.

986,048.

Specification of Letters Patent.

Patented Mar. 7, 1911.

Application filed November 22, 1909. Serial No. 529,320.

*To all whom it may concern:*

Be it known that I, ALFRED J. DIESCHER, residing at Pittsburg, in the county of Allegheny and State of Pennsylvania, a citizen of the United States, have invented or discovered certain new and useful Improvements in Apparatus for Registering the Flow of Fluids, of which improvements the following is a specification.

In the operation of irrigating plants the water from the supply channel flows through weirs for the determination of the amount of water supplied to the consumer. It is obvious that the volume of water flowing over the edge of the weir will be dependent upon the head of water, the difference of height between the surface of water above the weir and the edge of the latter. As this head may vary from time to time, means are employed for recording any variation of such head, and after the ascertainment of the variations or head or pressure a calculation must be made, based on the average height or head of water for a given time, to ascertain the quantity of water flowing through the weir. Such a method can give only approximate results and not the exact amount of water delivered.

The invention described herein has for its object an exact measurement of the volume of fluids flowing through channels either closed or open for any given period of time.

The invention is hereinafter more fully described and claimed.

Figure 1:
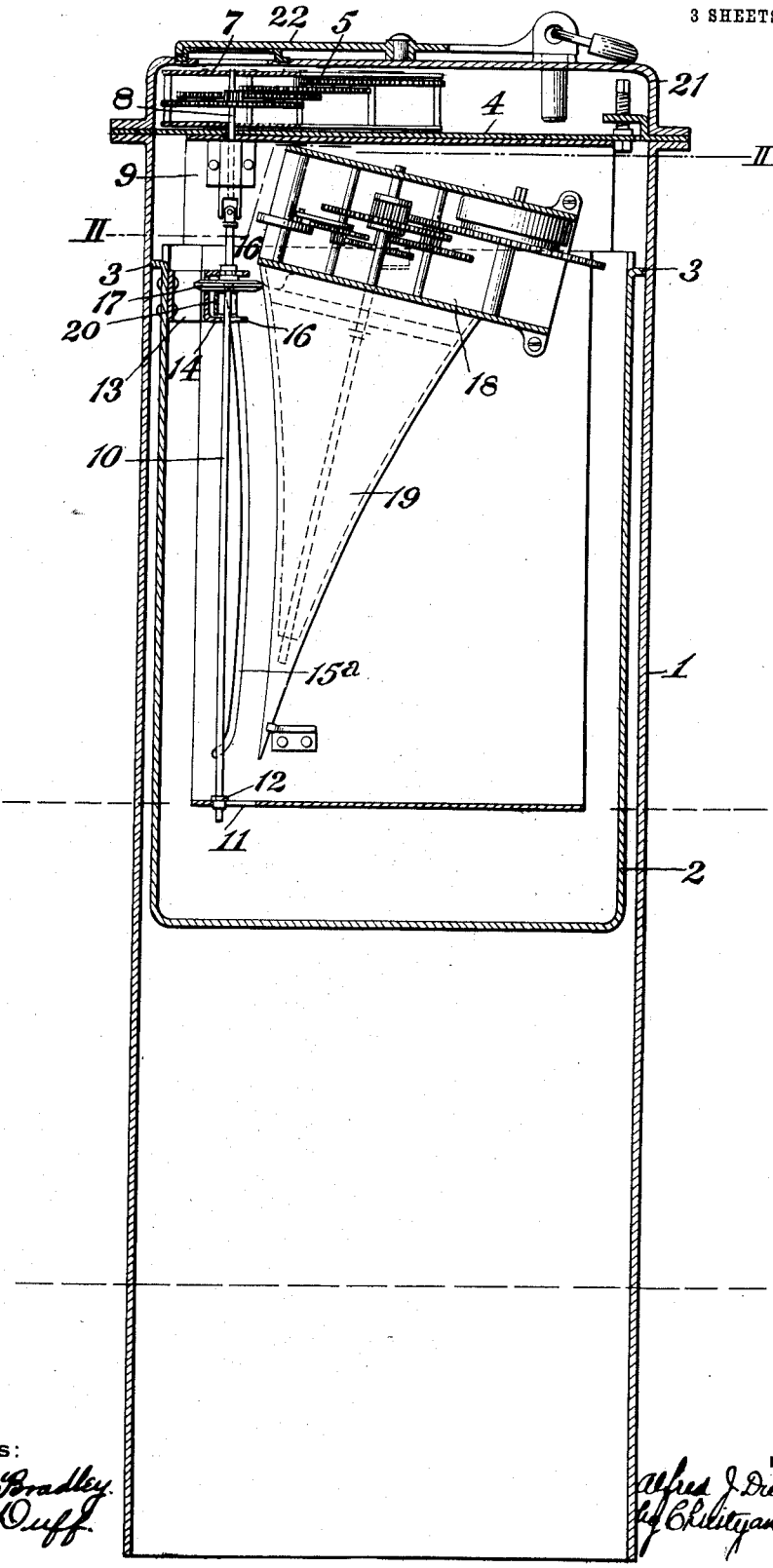
Figure 2:
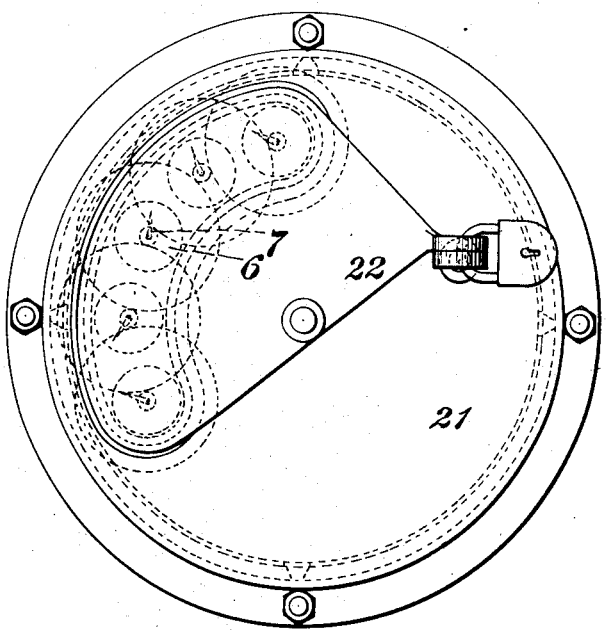
Figure 3:
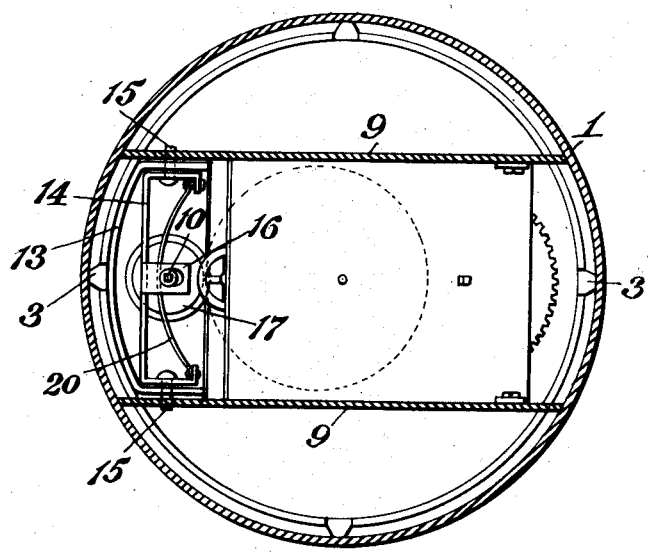
Figure 4:
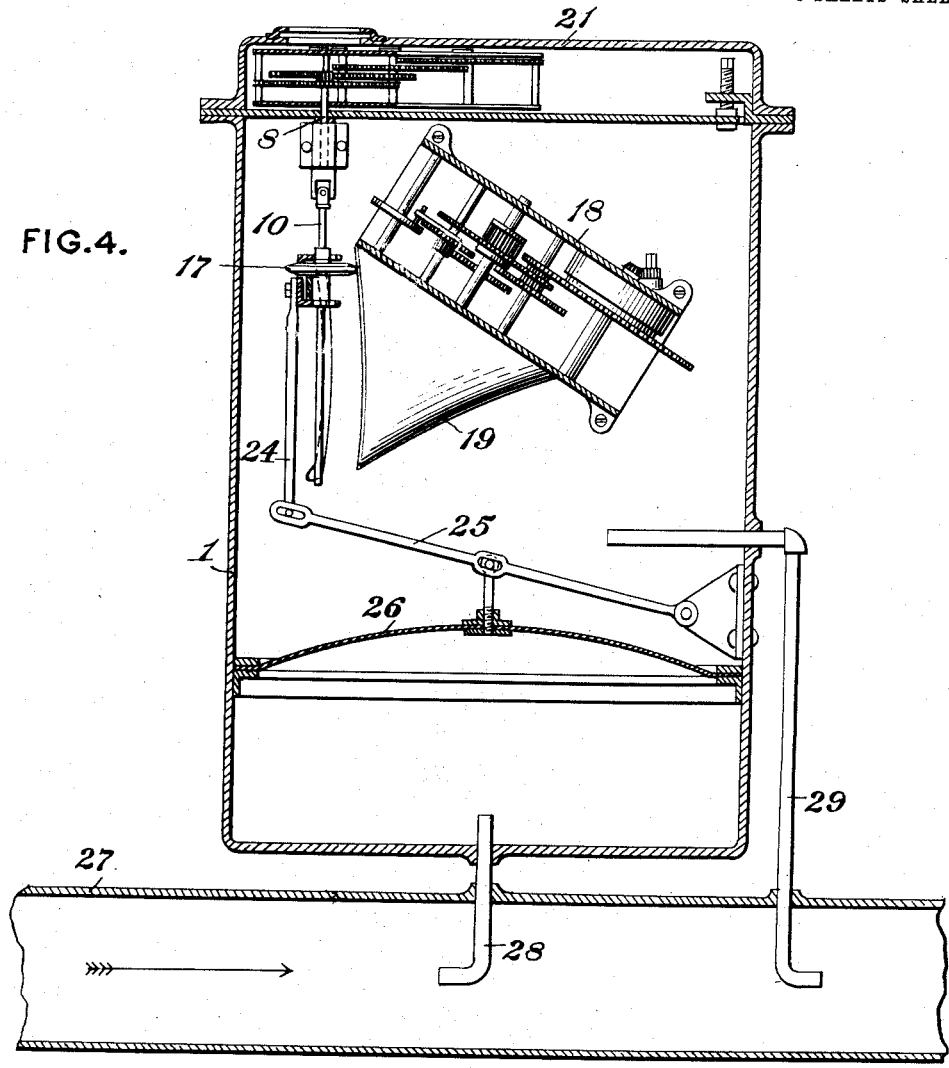
Figure 5:
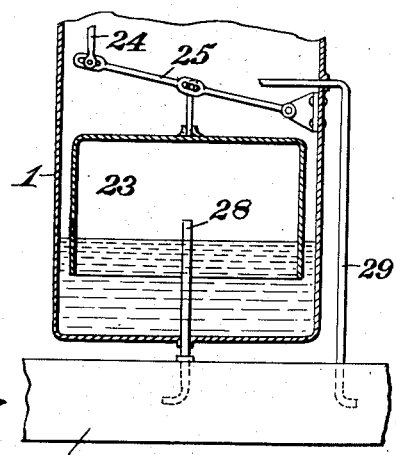

In the accompanying drawings forming a part of this specification, Figure 1 is a sectional elevation of my improved measuring apparatus; Fig. 2 is a top plan view of the same; Fig. 3 is a sectional view on a plane indicated by the line II—II Fig. 1; Fig. 4 is a sectional view illustrating a form of apparatus for measuring fluids flowing through closed channels or pipes; and Fig. 5 is a sectional view illustrating a modification of the form shown in Fig. 4.

In the practice of my invention for registering the flow of water in irrigation plants having open channels, a casing 1, provided with an inlet which is preferably through the bottom, is arranged in the channel adjacent to and above the weir. Within this shell a float 2 is arranged having a construction suitable to carry and actuate the parts or elements hereinafter described. The float consists preferably of a cup-shaped shell having its lower end closed. This shell which has an external diameter less than the internal diameter of the casing is guided in its movements by fingers 3, preferably formed integral with the float, as shown in Fig. 1, and bearing against the inner wall of the casing. A plate or diaphragm 4 is suitably supported preferably on the upper end of the casing and on this plate is mounted a train of gearing 5 such as is well known in the art for operating registering mechanism consisting of disks 6 having numbers indicating gallons or other quantity of liquid as cubic inches or feet, etc., and fingers 7 operative by the gearing. The initial member of the gearing is secured to a vertical shaft 8 which extends down through the plate 4, and has a bearing secured to a frame 9. The shaft is provided with an extension 10, movably connected to the shaft preferably by a universal joint, so that such extension may have a swinging as well as a rotary movement as hereinafter described. To avoid resistance to the movement of the extension in the guide slot 11, the roller 12 is loosely mounted thereon. A yoke 13 is so secured to the shell or float adjacent to the upper end of the latter, that the ends of the yoke will project in between the sides of the frame 9 as shown in Fig. 3. A second frame 14 is supported between the ends of the yoke by pins 15 passing through the yoke ends and extending into guide slots 15ª in the sides of the frame 9. It will be noticed that the lower end of this slot curves outwardly away from member 19 so that as soon as the flow of water is stopped, the disk 17 is drawn away from the member and the registering mechanism is stopped. The extension 10 of the shaft passes through slots in lugs 16 on the shifting frame, and through a disk 17 arranged between the lugs. The disk which is preferably provided with a rubber rim or tire, is so connected to the shaft that the latter will rotate with the disk, which is free to move along the shaft, such movement being effected by the float acting through the yoke 13 and frame 14. A driving member is so supported in the frame 9 in operative engagement with the disk 17 in any position of the float. This driving member is so constructed that although driven at a uniform speed by a suitable motor, it will impart to the disk and the registering mechanism, a rate proportional to the depth of the body of water passing over the edge of the weir, the greater the depth the higher the rate of rotation imparted to the disk. The driving member which is preferably a clock work mechanism 18 having a uniform rate, consists of a driving member 19 the surface of which is a curved surface of revolution secured to the shaft of the clock work. It will be understood that any other form of motor suitable for the purpose and having a uniform rate of rotation may be substituted for the clock work. As before stated the driving member is so supported in the frame 9 that the disk 17 will be in contact with the surface of the driving member at all times. This is insured by the pins 15 engaging the slots 15ª in the sides of the frame 9, the curvature of the slots corresponding to the longitudinal curvature of the side of driving member. The disk is yieldingly held in contact with the driving member by a spring 20, as shown in Figs. 1 and 3. The curvature of the sides of the driving member is determined by the points of intersection of coördinates representing respectively the vertical movement of the float and the number of gallons of water flowing over the edge of the weir per minute at the different depths of water between maximum and minimum depths. As the driving member is rotated uniformly it follows that the rate of rotation of the disk and registering mechanism will depend upon the position of the disk on the driving member.

The casing is closed by a cover 21 which incloses the registering mechanism and the cover should be locked in closed position. Suitable openings are formed in the cover to permit of reading the register, and for the insertion of a key for winding the clock spring. To prevent tampering with the register and the clock work a protecting plate 22 is pivotally mounted on the cover and can be locked in position to cover the openings in the cover, as shown in Fig. 2.

My improvement is equally adapted to the measurement of water or other fluids, as air or gas flowing through closed channels as pipes or conduits. In Fig. 4 is shown a construction adapted for the measurement of gaseous fluids, and consists of a closed case or shell 1 having a removable cover 21. Within this closed casing the registering mechanism is arranged substantially as shown in Fig. 1, except that when a float is employed for shifting the disk 17 along the driving member 19, a suitable quantity of liquid as water is placed in the casing as shown in Fig. 5, and an inverted cup-shaped float 23 is employed. The float may be connected to the disk for shifting the latter in the manner shown in Fig. 1, or a rod 24 having a fork at one end to engage and shift the disk may have its lower end connected to one end of a lever 25 which is also connected to the float, as shown in Fig. 5. While a float can be used where the pressure of the fluid being measured is low, it is preferred to substitute a flexible diaphragm 26 for the float as shown in Fig. 4, where the pressures are high. Where a float is employed its weight and that of the parts connected thereto will insure that it will respond to changes of pressure either up or down. The same response is insured in the construction shown in Fig. 4 by the resilience of the diaphragm or a weight, such as that of the parts connected and shiftable by the diaphragm.

The pipe 27 conveying the fluid to be measured is connected to the casing at a point below the float or diaphragm by a tube 28 having the inlet opening within the pipe facing in such direction that the fluid entering the casing below the diaphragm will have a pressure equal to the pressure in the pipe plus an amount due to the velocity of flow along the pipe. The portion of the casing above the diaphragm or float is connected by a tube 29 to the pipe 27, but the inlet of this tube which is within the pipe is so located that the fluid in the portion of the casing above the diaphragm will have a pressure equal to that in the pipe and will not be affected by changes in the rate of flow or if so, such effect will be the reverse of that produced below the diaphragm or float.

The curvature of the driving member will correspond to what is termed the "curve of flow" which may vary with the transverse dimensions of the pipe or channel. This curve is determined by the intersections of coördinates representing the pressure and velocity of the fluid, in accordance with rules well known in the art, and as hereinbefore described in relation to liquids.

I claim herein as my invention:

1. In an apparatus for measuring fluid, a registering mechanism in combination with a member controlling the registering mechanism, means for moving one of said parts relatively to the other in accordance with changes affecting the flow of the fluid being measured, said member having an uninterrupted surface curved in the direction of the relative movement of said parts, such curvature substantially coinciding with the curve of flow of the fluid and means for operating one of said parts at a predetermined speed.

2. In an apparatus for measuring fluids, a registering mechanism in combination with a driven member for operating the registering mechanism, means for moving one of said parts relatively to the other in accordance with changes affecting the flow of the fluid being measured, the driven member having an uninterrupted continuous driving surface curved in the direction of the relative movement of said parts, such curvature substantially coinciding with the "curve of flow" of the fluid.

3. In an apparatus for measuring fluids, the combination of registering mechanism, a driving member, means for rotating the driving member at a substantially uniform rate, the driving member having an uninterrupted surface curved in the direction of the relative movement of said parts, such curvature substantially corresponding to the "curve of flow" of the fluid to be measured, means movable along such curved surface for controlling the registering mechanism and mechanism for shifting such controlling means.

4. In an apparatus for measuring fluids the combination of a registering mechanism, a driving member, means for rotating the driving member at a substantially uniform rate, said member having a continuous driving surface curved in the direction of the relative movement of said parts, such curvature substantially corresponding to the "curve of flow" of the fluid being measured, a disk in frictional engagement with the driving member, means for adjustably connecting the disk to the registering mechanism, and means for changing the relative positions of the disk and driving member in accordance with changes affecting the flow of the fluid.

5. In an apparatus for measuring fluids, the combination of a registering mechanism, a driving member, means for rotating the driving member at a uniform rate, said member having an uninterrupted driving surface curved in the direction of the relative movement of said parts, such curvature substantially corresponding to the "curve of flow" of the fluid being measured, a shaft connected to the registering mechanism, a disk adapted to rotate the shaft and movable along the same and frictionally engaging the driving member, and means for shifting the disk along the driving member in accordance with changes affecting the flow of the fluid.

6. In an apparatus for measuring fluids, the combination of a registering mechanism, a casing or shell adapted to be connected to the channel for the fluid to be measured, a movable member arranged in the casing or shell, means for shifting said member in accordance with changes in the fluid to be measured affecting its flow, a motor operating at a uniform rate, connections from the motor to the registering mechanism including a member having an uninterrupted surface curved in the direction of the relative movement of said parts, such curvature corresponding substantially with the "curve of flow" of the fluid being measured, such connections being adjustable by the movable member to vary the operation of the registering mechanism in accordance with such changes in the fluid.

In testimony whereof, I have hereunto set my hand.

ALFRED J. DIESCHER.

Witnesses:
ALICE A. TRILL,
FRANCIS J. TOMASSON.